(12) United States Patent  (10) Patent No.: US 8,752,013 B2
Hadar et al.  (45) Date of Patent: Jun. 10, 2014

(54) SYSTEM AND METHOD FOR EVALUATING AND SELECTING SOFTWARE COMPONENTS AND SERVICES

(75) Inventors: Eitan Hadar, Nesher (IL); Yaakov Noson Shapiro, New Hempstead, NY (US)

(73) Assignee: CA, Inc., Islandia, NY (US)

( * ) Notice: Subject to any disclaimer, the term of this patent is extended or adjusted under 35 U.S.C. 154(b) by 1066 days.

(21) Appl. No.: 12/725,859

(22) Filed: Mar. 17, 2010

(65) Prior Publication Data

US 2011/0231817 A1   Sep. 22, 2011

(51) Int. Cl.
    *G06F 9/44* (2006.01)
(52) U.S. Cl.
    USPC .................. 717/121; 717/101; 717/120
(58) Field of Classification Search
    None
    See application file for complete search history.

(56) References Cited

U.S. PATENT DOCUMENTS

| | | | | |
|---|---|---|---|---|
| 7,873,720 B2 * | 1/2011 | Schindler et al. | ............. | 709/223 |
| 2011/0231252 A1 * | 9/2011 | Sattaru | ...................... | 705/14.49 |

OTHER PUBLICATIONS

Dobrica, L., et al., "A survey on software architecture analysis methods", *IEEE Transactions on Software Engineering*, 28(7), (Jul. 2002), 638-653.

Kazman, Rick, et al., "ATAM: Method for Architecture Evaluation", *Software Engineering Institute, Carnegie Mellon Technical Report, CMU/SEI-2000-TR-004, ESC-TR-2000-004*, http://www.sei.cmu.edu/reports/00tr004.pdf, (Aug. 2000), 82 pgs.

* cited by examiner

*Primary Examiner* — Chuck Kendall
(74) *Attorney, Agent, or Firm* — Schwegman, Lundberg & Woessner, P.A.

(57) ABSTRACT

A system that includes one or more computer processors is configured to receive parameters relating to non-functional attributes of a proposed software component, parameters relating to non-functional attributes of one or more available software components, and a weight for each of the non-functional attributes. The system calculates a quality and a risk for each available software component as a function of the parameters of the proposed software component, the parameters for the one or more available software components, and the weight for each of the non-functional attributes. The system outputs to a display device one or more of the quality and the risk for the one or more available software components.

25 Claims, 7 Drawing Sheets

FIG. 1

|   | REQUIRED | ACTUAL |
|---|---|---|
| 4 | MUST HAVE | EXISTS |
| 3 | WILL BE NEEDED | WILL BE IMPLEMENTED |
| 2 | MAY BE NEEDED | CAN SUPPORT |
| 1 | NOT NEEDED | CANNOT BE IMPLEMENTED |

FIG. 2

| COMPONENT PERSPECTIVE | | | | | |
|---|---|---|---|---|---|
| TOTAL QUALITY | | | | | 0.03333 |
| RISK | | | | | -0.2 |
|  | REQUIRED | ACTUAL | GAP | WEIGHTS |  |
| HIGH AVAILABILITY | 2 | 3 | 1 | 0.7 | 0.23333 |
| SCALABILITY | 4 | 4 | 0 | 0.1 | 0 |
| PORTABILITY | 4 | 1 | -3 | 0.1 | -0.2 |

FIG. 3

| PRODUCT 1 | | | | | |
|---|---|---|---|---|---|
| COMPONENT | | PRODUCT | | BUSINESS UNIT | |
| TOTAL QUALITY | RISK | TOTAL QUALITY | RISK | TOTAL QUALITY | RISK |
| C1 | -0.60 | -0.78 | -0.76 | -0.78 | -0.65 | -0.78 |
| C2 | -0.08 | -0.14 | 0.63 | -0.05 | -0.58 | -0.69 |

SYSTEM AND METHOD FOR EVALUATING AND SELECTING SOFTWARE COMPONENTS AND SERVICES

TECHNICAL FIELD

The present disclosure relates to the evaluation and selection of software components and services, and in an embodiment, but not by way of limitation, a system and method for evaluating and selecting software components and services for a particular architecture.

BACKGROUND

In large research and development (R&D) organizations, where products are developed at different sites around the globe, architecture and management communications are of the essence. Making a judgment call on architectural changes requires the perspectives of different stakeholders, users, or user types who often communicate in different languages. This diversity of the architectural languages, modeling approaches, design methodologies, best practices, and experiences introduces several challenges. These challenges include creating a common understanding and accurate visibility into a product's current architecture, and evaluating and determining where to invest efforts of re-engineering existing products as well as generating a new architecture-centric evolution plan for the portfolio at large.

DETAILED DESCRIPTION

The diversity of architectural languages, modeling approaches, design methodologies, best practices, and experiences introduces several challenges into maintaining and evolving a software system architecture. Fusing these languages and perspectives into simple evaluation criteria would be helpful for a business unit in order to drive a common agenda, because the diversity of architectural documented artifacts, new methodologies, and suggested standards could generate endless debates. The problem is even more crucial immediately after mergers and acquisitions of different business units or organizations. Weaving new technology and best practices into an existing portfolio while at the same time showing an immediate value in technology replacement or valuable integrations is important to a growing enterprise and its success.

In most instances, any particular business unit is eager to embrace an opportunity, and adapt and improve its technology. Unfortunately, this takes time, and usually opposition emerges due to possible delays, lack of accurate communication, or proper understanding of the architectural documents. The solution should be simple and lean—that is, any architect should be able to browse another product's components and blueprints as easily as they browse his or her own. However, in order to do this, a basic lexicon or vocabulary needs to be agreed upon, and usage of this lexicon or vocabulary should be governed.

One or more embodiments disclosed herein relate to architecture-centric evolution, which deals with planning evolutionary changes to ready made components off-the-shelf (COTS) as well as a hands-on evaluation of the constantly changing information technology (IT) architecture. Visibility into different components and their quality assessments are crucial vehicles allowing an information technology (IT) manager to define an architectural change roadmap. In order to define an architectural change, the non-functional attributes of the system components and overall utilization must fit the users' or stakeholders' current and future needs.

To fulfill such current and future needs, one must, among other things, search for candidate common components that bring new technological value to a software architecture. One must also reduce development efforts for similar technological gadgets by leveraging existing solutions (opportunistic and spontaneous development) that were not constructed for the change in the first place. One should also delegate non-business related technology to infrastructure and third party projects. One should further search for duplicated services which may cause customer confusion and rid the architecture of such duplication.

The commonality of all these needs is the basic task of inventorying the portfolio—that is, "the bill of material." However, it should be accompanied by a quality assessment and derived architectural roadmap. The evaluated quality attributes are derived from the non-functional characteristics of these components, and comply with the needs of stakeholders, users, and user types or groups. Based on understanding the existing architecture, one can decide on strategic and tactical directions, maximizing the existing investments.

Prior methods are based on a process of ascertaining that a certain proposed architectural design contains a solution to an architectural need. Some IT managers may do this analysis at the end of the development by checking if the final result indeed provided a solution to the required needs. Thus, these tools are focused on evaluating the probability of success of a design as well as a convergence of the requirements. Other tools evaluate the architecture quality in terms of integration mismatch, or technical compatibility. The tools propose to evaluate the mismatch between the components, i.e., the composition and dependency of a structure and dealing with interface integration (interface attributes). They do not evaluate these architectural dependencies over a full structure composition and for systems of systems, including Service-Oriented Architecture (SOA) technology and Software as a Service (SaaS).

The disclosed embodiments herein relate to introducing and dealing with a software architectural change within an organization. The proposed ComVal (Component E-Valuation) methodology is comprised of a minimal and lean set of artifacts that can form an understanding of the software architecture utilization and quality. It describes perspectives in conducting an architecture investigation and evaluation while documenting the portfolio architecture. The activity caters to both management and architects while balancing what should be done in theory versus what can be done in practice.

Many reasons for conducting software architectural investigations exist. Classical examples include searching for candidate common components that bring new technological value, reducing development efforts for similar technological gadgets by leveraging existing solutions, delegating non-business related technology to infrastructure and third party projects, and searching for duplicated services which may cause customer confusion, just to list a few examples. The commonality of all these needs is the basic task of inventorying the portfolio—namely, "the bill of material," with quality assessment and a derived software architectural roadmap. The evaluated quality attributes are derived from the non-functional characteristics of these components, and comply to stakeholders needs. Based on understanding the existing architecture, one should decide on strategic and tactical directions, maximizing the existing investments.

Architecture-centric evolution requires hands-on evaluation of a constantly changing architecture. Visibility into different components and their quality assessments are crucial vehicles that allow a manager to define an architectural change roadmap. In order to define an architectural change, the non-functional attributes of the system components and overall utilization must fit the stakeholders' or users' current and future needs. An embodiment of this current disclosure, which as noted above can be referred to as the ComVal system and methodology, targets architecture evaluation which in turn drives management decisions. The ComVal system and methodology provide an aggregated dashboard that presents quality and risk values for each software component. These quality and risk values are weighted by users' or stakeholders' preferences. The ComVal system and methodology are anchored by a component catalog that provides a state-of-the-art view of the components' technical specifications.

More specifically, the ComVal system and methodology are targeted for searching within a catalog of off-the-shelf components and services, according to functional and non-functional attributes, and selecting the feasible candidates that best fit the users' or stakeholders' requirements. Based on the selection, a proposed architecture component can be evaluated for possible integration or architectural change and thus drive management decisions.

In an embodiment, the ComVal system and methodology provide a unique aggregated dashboard that presents quality and risk values for each candidate component and service (i.e., software). The quality and risk values are weighted by different users' stakeholders' preferences. The ComVal system and methodology are anchored by a component catalog that provides a state-of-the-art view of the components' technical specifications. The tool and methodology cater to both management and architects, driving architectural roadmap construction, and they provide constant understanding of the enterprise architecture status.

Embodiments of the ComVal system, tool, and methodology are imbued with one or more of the following features. The system assesses relative risk and quality of software components and services by comparing, rating, and averaging an overall component and service architecture's existing attributes. In generating this assessment, the system considers changing architectural needs. The quality of the architecture is defined by using two main attributes—quality and risk, calculated for each attribute as disclosed in further detail below. Risk represents the amount of non-conformance to different users' or stakeholders' needs. For example, if portability of a proposed software component or service is a user need, then an available software component or service that is not easily rendered portable would be labeled with a higher risk. The assessment and evaluation can be done throughout the software life duration. Consequently, what was once acceptable may not be in the future, and thus a need for architecture evolution is triggered.

In order to evaluate and rate the architectural quality, an information system is provided and contains all the technical data along with its numerated values, numerated values of the requirements, and numerated weights.

Overall presentations of all the software components and services can be used for overall comparison of different software components and services and selection of the best software component and service. Thus, an e-commerce approach for an "on-line" component and services catalog is enabled. The quality estimation can be for a single service, component, or even several components and services (prior to evaluating their interface based matching). Thus, granularity of the evaluation is based on the smallest component inserted and documented in the information system. The overall quality of the different users or stakeholders can be presented in a single view, showing the different evaluations in a single view, thus enabling design discussions on the areas of disagreement among the software components and services. After filtering feasible components according to quality criteria and functional value, the users collect candidate components and services and compare their quality and risk, in order to prioritize and select the best feasible candidate for further usage. In an embodiment, an automated quality assessment is not coupled with the software life cycle, or architecture process.

Figure 1:
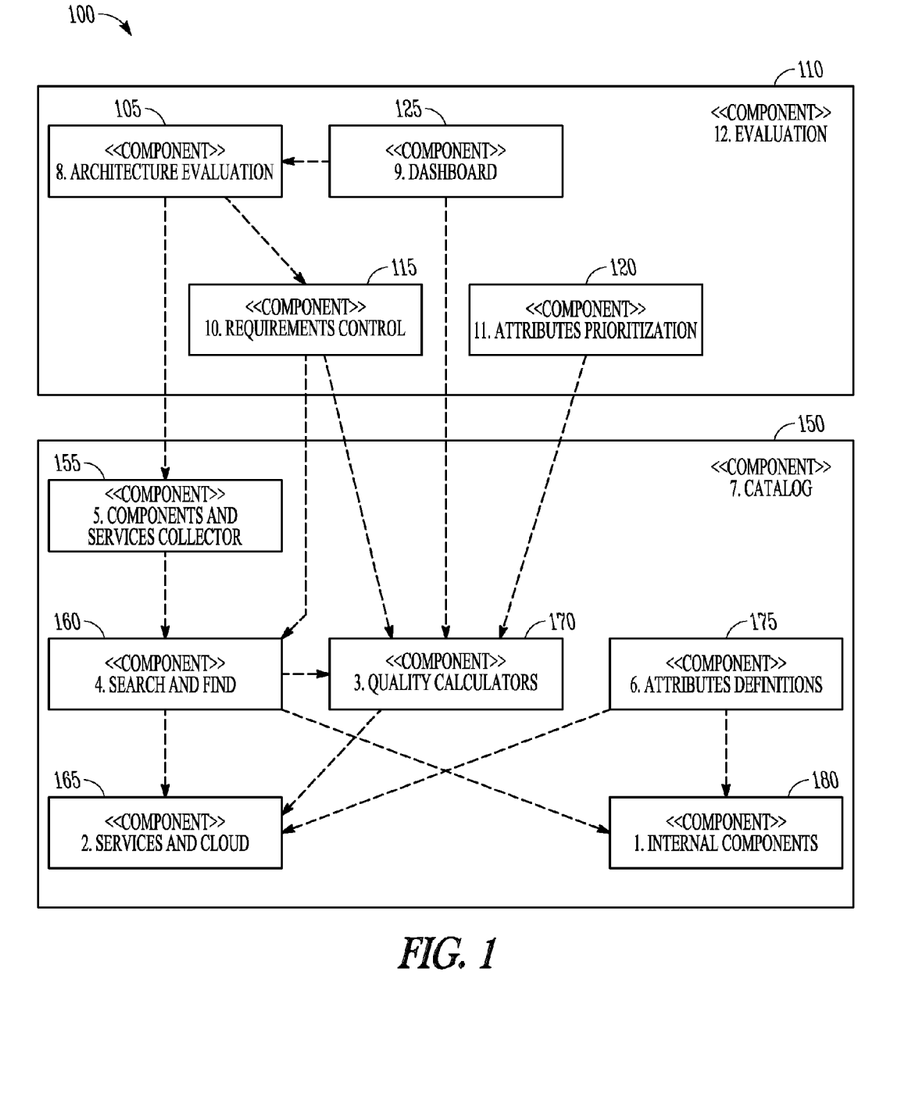
FIG. 1 is an example embodiment of a system for evaluating and selecting software components and services.

Referring to FIG. 1, an embodiment of a system 100 for evaluating and selecting software components and services includes a catalog sub-system 150. The catalog sub-system 150 contains several modules, each of which has a different value for the overall solution of selecting the best software component and service. The internal components 180 and the services and cloud modules 165 contain the basic information system and database that maintain all the architectural information about the components or services that an organization is interested in monitoring. The modules 165 and 180 provide an inventory purchased or candidate possible components or services to use. Component and service attributes of an inventory list of entities are defined and configured using an attributes definitions module 175 that selects the values and defines the status of each of the document components. A quality calculator module 170 calculates the quality and risk, as outlined below, for each of the attributes of the stored components, within the internal components module 180 or the services and cloud module 165. The search and find module 160 enables the retrieval of candidate components stored in the internal components module 180 and the services and cloud module 165, and it filters them according to information provided by the quality calculators 170. The retrieved list of candidate components may be stored temporarily and organized in different collections within the components and services module 155.

Figure 3:
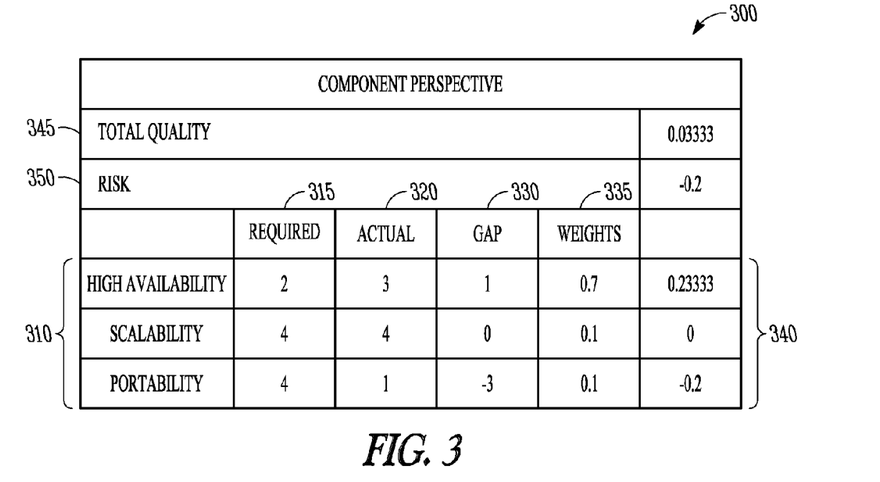
FIG. 3 is an example embodiment of a dashboard for displaying a quality and risk for a software component and service.
Figure 4:
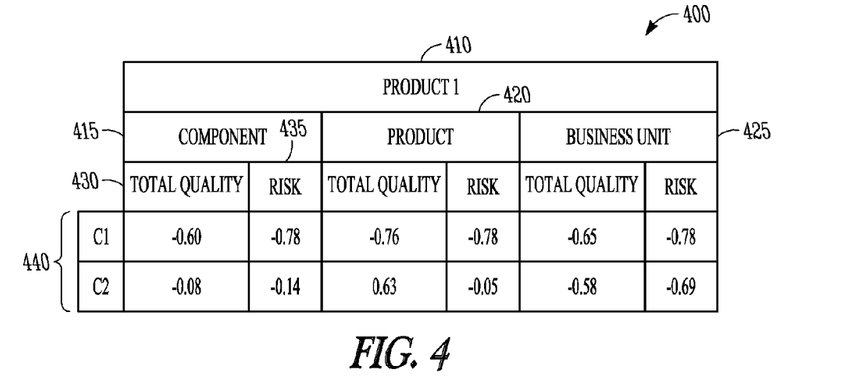
FIG. 4 is an example embodiment of a dashboard for displaying the quality and risk for a plurality of software components and services for a plurality of different user types.

The second sub-system is the evaluation module 110. The evaluation module 110 includes the requirements control module 115 that provides a configuration mechanism for setting requirements for different stakeholders for a certain component, or for a set of components, and thus maintains the "Required" state of each of the maintained inventory items. The requirements control module 115 affects the quality calculators 170 and uses the search and find module 160. The attributes prioritization module 120 enables stakeholders to configure the different importance level of each of the documented attributes within the component, thereby affecting the mathematics of the quality calculators module 170. The architecture evaluation module 105 aggregates all the quality and risk attributes of all the components and services evaluated within the components and service collector module 155, and it also provides different drill-in information and reports. The dashboard module 125 provides different reports, examples of which are illustrated in FIGS. 3 and 4, and it serves as an overall enterprise architecture view for all the components within the organization. It can have different filters and definitions of what to observe, using the architecture evaluation module 105.

Figure 7A:
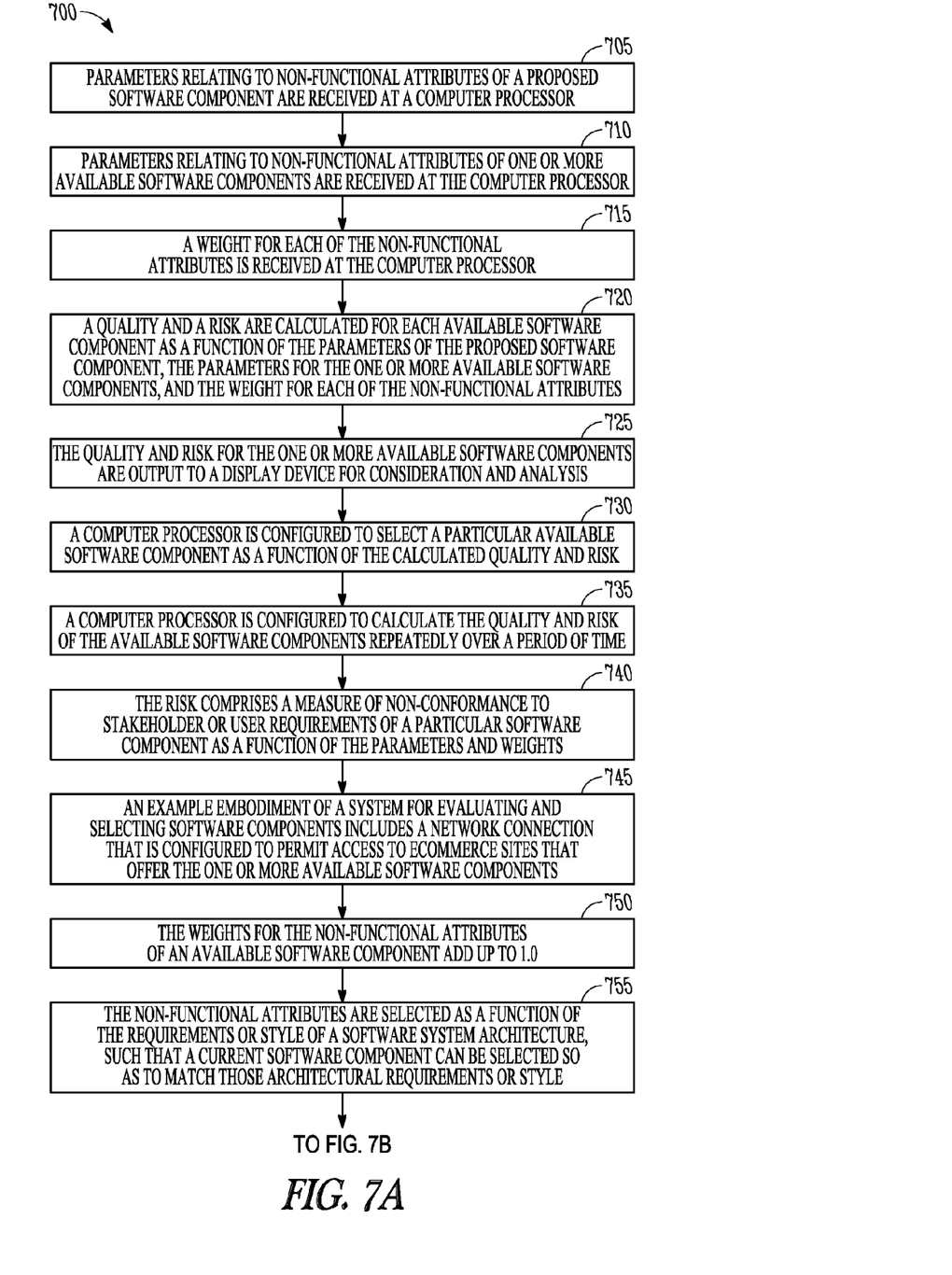
FIGS. 7A-7B is a flowchart of an example process for evaluating and selecting software components and services.
Figure 7B:
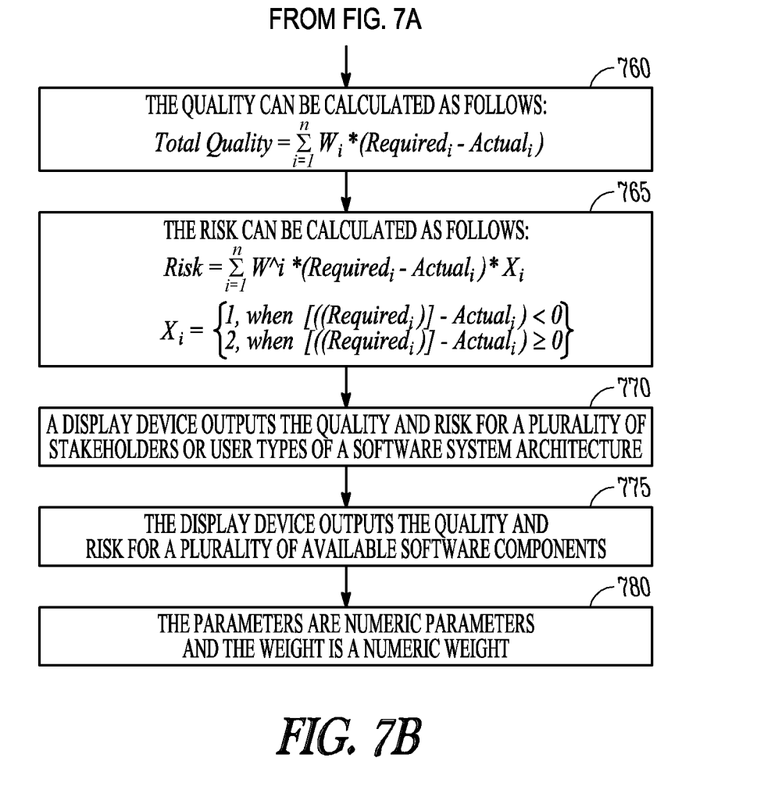

FIGS. 7A-7B is a flowchart of an example process 700 for evaluating and selecting software components and services. FIGS. 7A-7B include a number of process blocks 705-780. Though arranged serially in the example of FIGS. 7A-7B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 5:
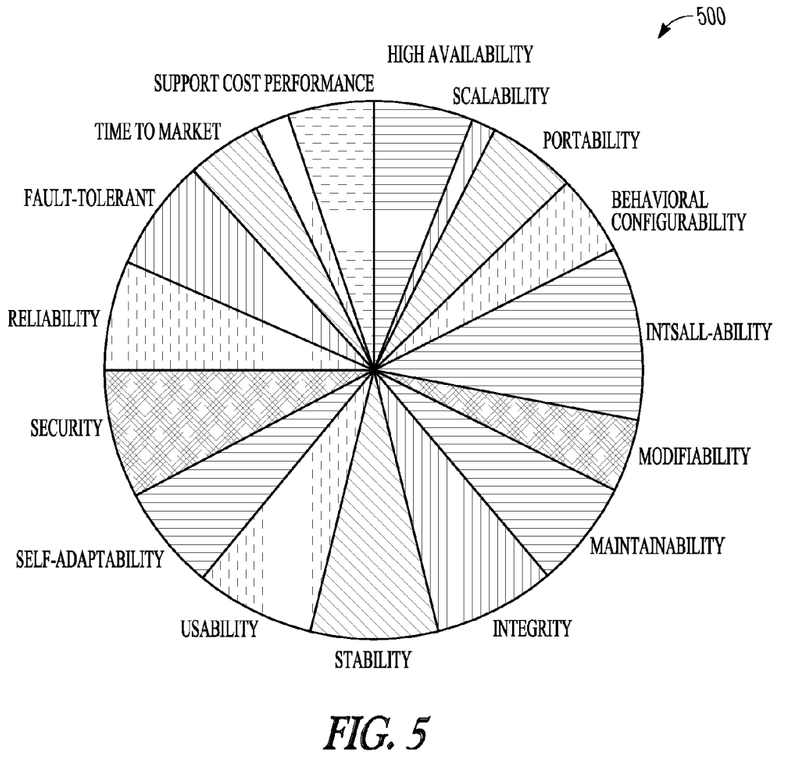
FIG. 5 is an example embodiment of a pie chart comprising a plurality of non-functional attributes of a software component or service.

Referring now specifically to the process 700 of FIGS. 7A-7B, at 705, parameters relating to non-functional attributes of a proposed software component or service are received at a computer processor. A proposed software component can be virtually any piece of software or the service related to it. The component can be standalone, such as word processing software. It can also be of a support or plug-in nature, such as add-on software that improves a local area network or a more efficient use of a printer or network of printers. Examples of non-functional attributes are illustrated in FIG. 5, and include high availability, scalability, portability, behavioral configurability, installability, modifiability, maintainability, integrity, stability, usability, self-adaptability, security, reliability, fault tolerance, time to market, support cost, and performance.

At 710, parameters relating to non-functional attributes of one or more available software components or services are received at the computer processor. Available software components and services refer to software that is available for purchase, either through retail means for virtually any consumer, or through corporate means for complex software develop by software development companies for its business customers. Available software components and services can also be labeled as commercial off the shelf (COTS) components.

At 715, a weight for each of the non-functional attributes is received at the computer processor. Different weights can be assigned to different non-functional attributes to indicate the attributes that are either more or less important to a particular stakeholder or group of stakeholders. At 720, a quality and a risk are calculated for each available software component and service as a function of the parameters of the proposed software component or service, the parameters for the one or more available software components and services, and the weight for each of the non-functional attributes. As will be explained in more detail below, the calculated quality is a normalized simple sum of the non-functional attributes that are being considered for a particular proposed software component or service, and the risk is a measure of a software component's non-conformance with a stakeholder's or user's needs. At 725, the quality and risk for the one or more available software components and services are output to a display device for consideration and analysis.

At 730, a computer processor is configured to select a particular available software component or service as a function of the calculated quality and risk. This feature can be implemented in several manners. For example, the processor could be configured to simply select the software component with the highest quality and lowest risk. As another example, the processor could be configured to select two software components or services—a first with the highest quality and a second with the lowest risk. As another example, the processor could be configured to first select the top three quality components, and then out of those top three quality components, select the component with the lowest risk (even though it may not be the highest quality). Persons of skill in the art will realize that the processor could be configured in other ways also.

At 735, a computer processor is configured to calculate the quality and risk of the available software components and services repeatedly over a period of time. These repetitive calculations can provide an evolutionary analysis for a software system architecture. For example, if a particular available component increases in quality and decreases in risk over a time period, then a stakeholder may eventually decide to modify his or her system by incorporating this component into the system. At 740, it is noted that the risk comprises a measure of non-conformance to stakeholder or user requirements of a particular software component or service as a function of the parameters and weights. That is, as an available software component or service adheres to fewer and fewer stakeholder or user requirements, the higher the risk that is associated with implementing that particular software component.

At 745, an example embodiment of a system for evaluating and selecting software components and services includes a network connection that is configured to permit access to ecommerce sites that offer the one or more available software components and services. Consequently, after reviewing quality and risk scores of the available components and services, a stakeholder or user can decide which component should be selected, and access one or more ecommerce sites at which the component or service can be purchased. At 750, it is noted that in an embodiment, the weights for the non-functional attributes of an available software component or service add up to a predetermined value such as 1.0. At 755, the non-functional attributes are selected as a function of the requirements or style of a software system architecture, such that a current software component or service can be selected so as to match those architectural requirements or style. For example, if system availability is of paramount importance, then function attributes such as high availability, stability, reliability, and fault tolerance may be selected to match the system architecture that was designed for high system availability.

Process block 760 discloses an example method of the manner in which to calculate the quality of a software component or service. Specifically, the quality can be calculated as follows:

$$\text{Quality} = \sum_{i=1}^{n} W_i * (Required_i - Actual_i)$$

In the above equation, the n term represents the number of non-functional attributes. The Required term represents the non-functional attributes of a proposed software component or service. The Actual term represents the non-functional attributes of an available software component or service. The W term represents a weight that is associated with a non-functional attribute.

Similarly, process block 765 discloses an example method of the manner in which to calculate the risk associated with a software component or service. Specifically, the risk can be calculated as follows:

$$Risk = \sum_{i=1}^{n} W_i * (Required_i - Actual_i) * X_i$$

$$X_i = \left\{ \begin{array}{ll} 1, & \text{when } [(Required]_i - Actual_i) < 0 \\ 0, & \text{when } [(Required]_i - Actual_i) \geq 0 \end{array} \right\}$$

In the above equation, the n term represents the number of non-functional attributes. The Required term represents the non-functional attributes of a proposed software component or service. The Actual term represents the non-functional attributes of an available software component or service. The W term represents a weight that is associated with a non-functional attribute.

At 770, a display device outputs the quality and risk for a plurality of stakeholders or user types of a software system architecture. This is best illustrated in FIG. 4, the details of which are explained below. At 775, the display device outputs the quality and risk for a plurality of available software components and services. This is also best illustrated in FIG. 4. At 780, it is noted that the parameters are numeric parameters and the weight is a numeric weight.

A typical usage of the ComVal system involves a research and development architect who populates a system catalog of components and services with architectural parameters as well as inserts needs (i.e., the requirements of different stakeholders). The information about the internal components of the company or internet-based services such as SaaS or Cloud computing are stored and available for selection. Service architects, a chief architect, and customers can use the catalog components by searching and finding components according to query filters, or by selecting the highest quality components according to reports and graphical aids provided by the reports and dashboard module 110. The architects and customers can collect a set of components or services, and evaluate their overall proposed quality and risk. One of skill in the art will realize other uses as well.

One or more embodiments further provide a new way (with tools) to perform an information technology (IT) components and services evaluation, either for a single element or for a collection of components and services. Existing methods are focused primarily on a software components and services set evaluation (a full architecture) and not targeted for composing an IT enterprise feasibly check. Additionally, automated quality evaluation is decoupled from a development process (unlike sporadic, mostly manual existing alternatives). This results in automated views that describe the implemented software quality. Each time something is changed and documented in the architecture, the overall evaluation, and accordingly the quality and risk assessment, is construed. It therefore requires neither specific review sessions nor dedicated debates. As the requirements change (and are inserted into the system), the overall quality changes automatically, and the overall quality changes are reflected via the dashboard module 110. Each time a new component is added to the portfolio, and its current architecture status is documented, its quality is evaluated automatically concerning the existing state, without human intervention.

In an embodiment, an evaluation dashboard is provided for indicating the status of the components and services, and based on that, defining an architectural roadmap. An example of such a dashboard 400 is illustrated in FIG. 4. The dashboard presents the overall quality assessment of the components and services as well as acts as a facade and entry point to a detailed catalog. The dashboard includes the name of a product 410 (e.g., electronic mail), a plurality of stakeholders (e.g., component stakeholder 415, product stakeholder 420, and a business unit stakeholder 425), and a plurality of components 440 (e.g. several different electronic mail software components and services). The dashboard 400 further includes the calculated quality 430 and risk 435 for each component 440. The dashboard 400 provides total quality and risk assessments of the component or service according to three management stakeholders—component owners, product marketing, and a business unit. Using this dashboard for several products and services immediately displays duplications, dependencies and qualities in a single view. Thus, it enables visibility for management when discussing the actual architecture priorities.

As noted above, the overall quality and risk in FIG. 4 is calculated according to the following equations.

$$Quality = \sum_{i=1}^{n} W_i * (Required_i - Actual_i)$$

$$Risk = \sum_{i=1}^{n} W_i * (Required_i - Actual_i) * X_i$$

$$X_i = \left\{ \begin{array}{ll} 1, & \text{when } [(Required]_i - Actual_i) < 0 \\ 0, & \text{when } [(Required]_i - Actual_i) \geq 0 \end{array} \right\}$$

Figure 2:
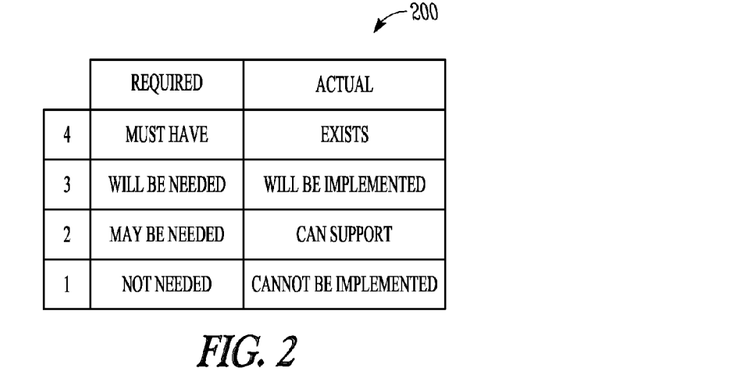
FIG. 2 is a table of example values of non-functional software architecture attributes.

In the above equations, n is the number of non-functional software or service architectural attributes evaluated, Required represents needed attributes, Actual is the actual implementation of these attributes, and W is the attribute relevant weight factor. FIG. 2 is a table 200 of possible values for the Required and Actual parameters. As table 200 illustrates, the values for the Required needs in this example embodiment are (1) not needed, (2) may be needed, (3) will be needed, and (4) must have. Table 200 further illustrates that Actual needs in this example embodiment are (1) cannot be implemented, (2) can support (3) will be implemented and (4) exists. FIG. 3 is a table 300 that illustrates how the Actual values 320 are subtracted from the Required values 315 of three non-functional attributes 310 (n=3) and multiplied by a relative weight 335. If the gap 330 is positive (zero and above), this indicates that the need is supported by the component or service. A negative value indicates that the component owners should invest effort in improving it.

The total quality 345 in FIG. 3 is a simple sum of all the values, after being normalized for the three non-functional attributes in this example. The risk 350 is calculated by summarizing only the software architecture change requests items, i.e., the negative weights only. In an embodiment, each user or stakeholder defines different priorities for the different non-functional attributes 310. As shown in the pie chart 500 of FIG. 5, these non-functional attributes can include high availability, scalability, portability, behavioral configurability, installability, modifiability, maintainability, integrity, stability, usability, self-adaptability, security, reliability, fault tolerance, time to market, support cost, and performance. FIG. 5 displays in the graphic form of pie chart 500 possible weights a certain user or stakeholder may construct for the non-functional needs.

Figure 6:
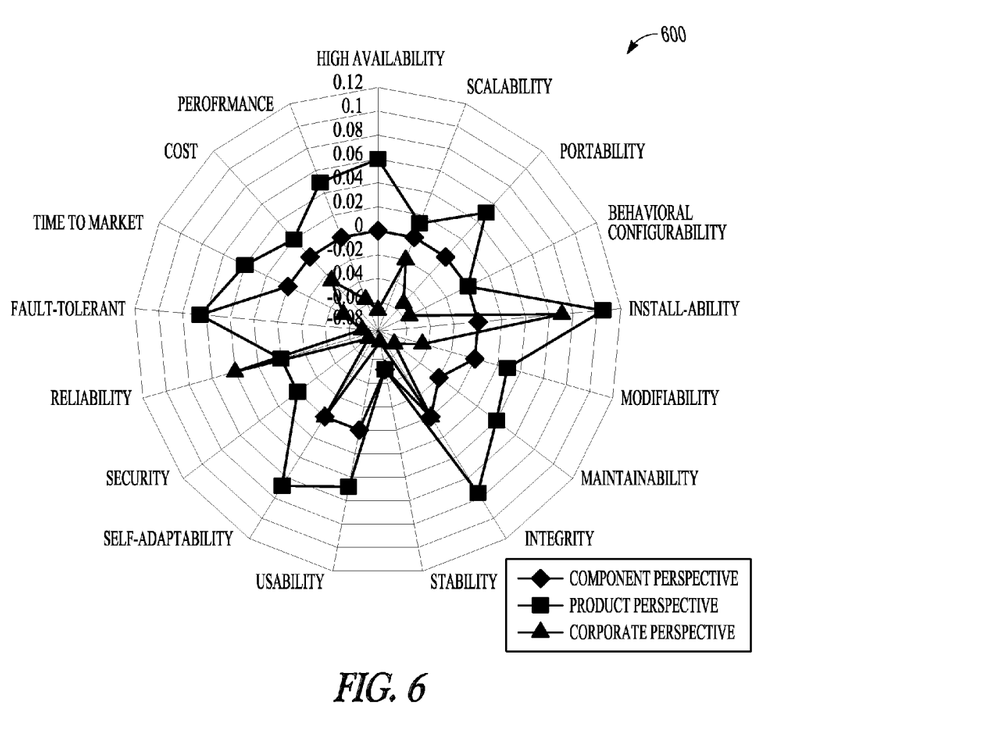
FIG. 6 is an example embodiment of a diagram that illustrates an aggregated view of all users' quality evaluations of a software component and service.

FIG. 6 displays the total quality gap in an aggregated view 600 of the difference between the value of a required attribute value and the actual fulfillment of that value, as it is being multiplied by the prioritization weight, and evaluated for all stakeholders.

The detailed description of each component and service in the catalog contains the functional offering, design principles, and activation techniques (i.e. the application programming interface (API)). It may also contain a list of the design patterns applicable to a certain attribute. For example, in the case of fault-tolerance, the component owner may define that this attribute is about providing fault confinement (isolation), a fault-detection checkpoint, and diagnostics (logging support). The architect can indicate the recovery patterns, such as retry and rollback, or types of restart, such as hot, warm, and cold. The component's interactions can also be captured, detailing dependencies within the catalog components and services.

In summary, creating a catalog requires management authority and approval since it consumes expensive time of architects and development managers. However, there is no need to document everything. Observing the required architectural changes according to the different quality attributes, one can detect if a certain component should be examined or not. An ongoing implementation of this approach can be focused on the re-factored components and services due to an integration requirement for a software architectural evolution. Several components and services can be removed from the main product and replaced with an external tool using integration techniques.

A method for applying the actual refactoring can generate a detailed software architectural description for both the changed product architecture and the external one. Quality attribute issues can be considered, and the need for change can be compared according to the different stakeholders' needs. A further embodiment can includes fully evaluating the rest of the components in the entire business unit based on the ComVal methodology. One of skill in the art will realize that overall evaluation of the software architecture is constantly changing since requirements always change. This basic principle, coupled with architecture-centric evolution that is visible by an embodiment of the disclosed dashboard, is a strong vehicle for managing software architectural changes, while maintaining a constant "hands-on" view on the component.

Figure 8:
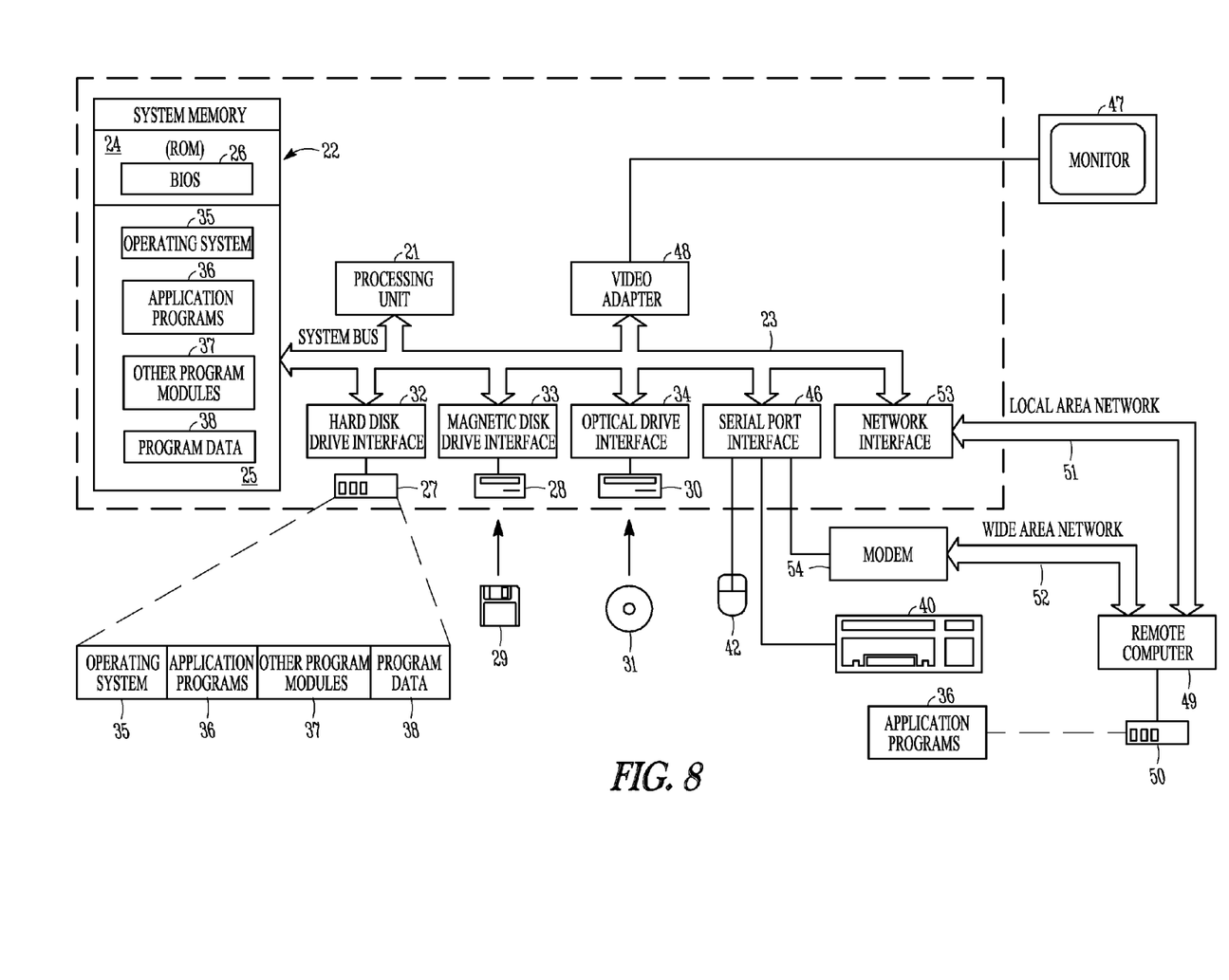
FIG. 8 is an example embodiment of a computer system upon which one or more embodiments of the present disclosure can operate.

FIG. 8 is an overview diagram of a hardware and operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for evaluating and selecting software components and services have been described. Embodiments of the invention include features, methods or processes embodied within machine-executable instructions provided by a machine-readable medium. In one embodiment, the term "machine-readable medium" or "computer-readable medium" shall be taken to include any tangible non-transitory medium which is capable of storing or encoding a sequence of instructions for execution by the machine and that causes the machine to perform any one of the methodologies. In a second embodiment separate from the first embodiment, the term "machine-readable medium" or "computer-readable medium" shall be taken to include any intangible transitory medium which is capable of storing or encoding a sequence of instructions for execution by the machine and that causes the machine to perform any one of the methodologies. Consequently, a machine-readable medium can be either transitory, non-transitory, tangible, or intangible in nature.

EXAMPLES

In Example 1, a system includes one or more computer processors that are configured to receive parameters relating to non-functional attributes of a proposed software component or service, receive parameters relating to non-functional attributes of one or more available software components or services, receive a weight for each of the non-functional attributes, calculate a quality and a risk for each available software component or service as a function of the parameters of the proposed software component or service, the parameters for the one or more available software components or services, and the weight for each of the non-functional attributes, and output to a display device or another computer processor one or more of the quality and the risk for the one or more available software components or services.

Example 2 includes one or more features of Example 1 and further optionally includes a system wherein the one or more processors are configured to select a particular available software component or service as a function of the calculated quality and risk.

Example 3 includes one or more features of Examples 1-2 and further optionally includes a system wherein the one or more processors are configured to calculate the quality and risk repeatedly over a period of time, thereby providing an evolutionary analysis for a software system architecture.

Example 4 includes one or more features of Examples 1-3 and further optionally includes a system wherein the risk comprises a measure of non-conformance to user requirements of a particular software component or service as a function of the parameters and weights.

Example 5 includes one or more features of Examples 1-4 and further optionally includes a network connection configured to permit access to one or more ecommerce sites offering the one or more available software components or services.

Example 6 includes one or more features of Examples 1-5 and further optionally includes a system wherein the weights for the non-functional attributes of a particular available software component or service add up to a predetermined value.

Example 7 includes one or more features of Examples 1-6 and further optionally includes a system wherein the non-functional attributes are selected as a function of the requirements or style of a software system architecture, such that a current software component or service can be selected so as to match those architectural requirements or style.

Example 8 includes one or more features of Examples 1-7 and further optionally includes a system wherein the quality of a single component is calculated as follows:

$$Quality = \sum_{i=1}^{n} W_i * (Required_i - Actual_i)$$

wherein n comprises a number of non-functional attributes;
wherein Required comprises non-functional attributes of the proposed software component or service;
wherein Actual comprises non-functional attributes of the available software components or services; and
wherein W comprises a set of weights associated with non-functional attributes.

Example 9 includes one or more features of Examples 1-8 and further optionally includes a system wherein the risk is calculated as follows:

$$Risk = \sum_{i=1}^{n} W_i * (Required_i - Actual_i) * X_i$$

-continued $$X_i = \left\{ \begin{array}{ll} 1, & \text{when } [(\text{Required})_i - \text{Actual}_i) < 0 \\ \hline 0, & \text{when } [(\text{Required})_i - \text{Actual}_i) \geq 0 \end{array} \right\}$$

wherein n comprises a number of non-functional attributes;

wherein Required comprises non-functional attributes of the proposed software component or service;

wherein Actual comprises non-functional attributes of the available software components or services; and wherein W comprises a set of weights associated with non-functional attributes.

Example 10 includes one or more features of Examples 1-9 and further optionally includes a system wherein the display outputs one or more of the quality and the risk for a plurality of user types of a set of components.

Example 11 includes one or more features of Examples 1-10 and further optionally includes a system wherein the display outputs one or more of the quality and the risk for a plurality of software components or services.

Example 12 includes one or more features of Examples 1-11 and further optionally includes a system wherein the parameters comprise numeric parameters and the weight comprises a numeric weight.

Any of Examples 1-12 can also be implemented as processes or embedded on a machine-readable medium.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A system comprising:
    one or more computer processors configured to:
        receive parameters relating to non-functional attributes of a proposed software component or service;
        receive parameters relating to non-functional attributes of one or more available software components or services;
        receive a weight for each of the non-functional attributes;
        calculate a quality and a risk for each available software component or service as a function of the parameters of the proposed software component or service, the parameters for the one or more available software components or services, and the weight for each of the non-functional attributes; and
        output to a display device, a computer memory, or another computer processor one or more of the quality and the risk for the one or more available software components or services.

2. The system of claim 1, wherein the one or more processors are configured to select a particular available software component or service as a function of the calculated quality and risk in connection with an integration of new technology and best practices in a software architecture change in an organization.

3. The system of claim 1, wherein the one or more processors are configured to calculate the quality and risk repeatedly over a period of time, thereby providing an evolutionary analysis for a software system architecture.

4. The system of claim 1, wherein the risk comprises a measure of non-conformance to user requirements of a particular software component or service as a function of the parameters and weights.

5. The system of claim 1, comprising a network connection configured to permit access to one or more ecommerce sites offering the one or more available software components or services.

6. The system of claim 1, wherein the weights for the non-functional attributes of a particular available software component or service add up to a predetermined value.

7. The system of claim 1, wherein the non-functional attributes are selected as a function of the requirements or style of a software system architecture, such that a current software component or service can be selected so as to match those architectural requirements of style.

8. The system of claim 1, wherein the quality of a single component is calculated as follows:

$$\text{Quality} = \sum_{i=1}^{n} W_i * (\text{Required}_i - \text{Actual}_i)$$

wherein n comprises a number of non-functional attributes;

wherein Required comprises non-functional attributes of the proposed software component or service;

wherein Actual comprises non-functional attributes of the available software components or services; and wherein W comprises a set of weights associated with non-functional attributes.

9. The system of claim 1, wherein the risk is calculated as follows:

$$\text{Risk} = \sum_{i=1}^{n} W_i * (\text{Required}_i - \text{Actual}_i) * X_i$$

$$X_i = \left\{ \begin{array}{ll} 1, & \text{when } [(\text{Required})_i - \text{Actual}_i) < 0 \\ \hline 0, & \text{when } [(\text{Required})_i - \text{Actual}_i) \geq 0 \end{array} \right\}$$

wherein n comprises a number of non-functional attributes;

wherein Required comprises non-functional attributes of the proposed software component or service;

wherein Actual comprises non-functional attributes of the available software components or services; and wherein W comprises a set of weights associated with non-functional attributes.

10. The system of claim 1, wherein the display outputs one or more of the quality and the risk for a plurality of user types of a set of components.

11. The system of claim 1, wherein the display outputs one or more of the quality and the risk for a plurality of software components or services.

12. The system of claim 1, wherein the parameters comprise numeric parameters and the weight comprises a numeric weight.

13. A computerized process comprising:
receiving into a computer processor parameters relating to non-functional attributes of a proposed software component or service;
receiving into the computer processor parameters relating to non-functional attributes of one or more available software components or services, wherein the available software components comprise software components that are available for purchase in a catalog of off the shelf software components;
receiving into the computer processor a weight for each of the non-functional attributes;
calculating with the computer processor a quality and a risk for each available software component or service as a function of the parameters of the proposed software component or service, the parameters for the one or more available software components or services, and the weight for each of the non-functional attributes; and
outputting to a display device, a computer memory, or to another computer processor one or more of the quality and the risk for the one or more available software components or services.

14. The computerized process of claim 13, comprising selecting a particular available software component or service as a function of the calculated quality and risk.

15. The computerized process of claim 13, comprising calculating the quality and risk repeatedly over a period of time, thereby providing an evolutionary analysis for a software system architecture.

16. The computerized process of claim 13, comprising establishing a network connection configured to permit access to one or more ecommerce sites offering the one or more available software components or services.

17. The computerized process of claim 13, wherein the non-functional attributes are selected as a function of the requirements or style of a software system architecture, such that a current software component or service can be selected so as to match those architectural requirements or style.

18. The computerized process of claim 13, wherein the quality of a single component is calculated as follows:

$$Quality = \sum_{i=1}^{n} W_i * (Required_i - Actual_i)$$

wherein n comprises a number of non-functional attributes;
wherein Required comprises non-functional attributes of the proposed software component or service;
wherein Actual comprises non-functional attributes of the available software components or services; and
wherein W comprises a set of weights associated with non-functional attributes.

19. The computerized process of claim 13, wherein the risk is calculated as follows:

$$Risk = \sum_{i=1}^{n} W_i * (Required_i - Actual_i) * X_i$$

$$X_i = \begin{cases} 1, & \text{when } [(Required)_i - Actual_i) < 0 \\ 0, & \text{when } [(Required)_i - Actual_i) \geq 0 \end{cases}$$

wherein n comprises a number of non-functional attributes;
wherein Required comprises non-functional attributes of the proposed software component or service;
wherein Actual comprises non-functional attributes of the available software components or services; and
wherein W comprises a set of weights associated with non-functional attributes.

20. A non-transitory machine-readable medium storing instructions, which, when executed by a processor, cause the processor to perform a process comprising:
receiving into a computer processor parameters relating to non-functional attributes of a proposed software component or service;
receiving into the computer processor parameters relating to non-functional attributes of one or more available software components or services;
receiving into the computer processor a weight for each of the non-functional attributes;
calculating with the computer processor a quality and a risk for each available software component or service as a function of the parameters of the proposed software component or service, the parameters for the one or more available software components or services, and the weight for each of the non-functional attributes; and
outputting to a display device, a computer memory, or to another computer processor one or more of the quality and the risk for the one or more available software components or services.

21. The non-transitory machine-readable medium of claim 20, comprising instructions for selecting a particular available software component or service as a function of the calculated quality and risk.

22. The non-transitory machine-readable medium of claim 20, comprising instructions for calculating the quality and risk repeatedly over a period of time, thereby providing an evolutionary analysis for a software system architecture.

23. The non-transitory machine-readable medium of claim 20, comprising instructions for establishing a network connection configured to permit access to one or more ecommerce sites offering the one or more available software components or services.

24. The non-transitory machine-readable medium of claim 20, wherein the quality of a single component is calculated as follows:

$$Quality = \sum_{i=1}^{n} W_i * (Required_i - Actual_i)$$

wherein n comprises a number of non-functional attributes;
wherein Required comprises non-functional attributes of the proposed software component or service;
wherein Actual comprises non-functional attributes of the available software components or services; and
wherein W comprises a set of weights associated with non-functional attributes.

25. The non-transitory machine-readable medium of claim 20, wherein the risk is calculated as follows:

$$Risk = \sum_{i=1}^{n} W_i * (Required_i - Actual_i) * X_i$$

-continued $$X_i = \begin{Bmatrix} 1, & \text{when } [(\text{Required})_i - Actual_i) < 0 \\ 0, & \text{when } [(\text{Required})_i - Actual_i) \geq 0 \end{Bmatrix}$$

wherein n comprises a number of non-functional attributes;
wherein Required comprises non-functional attributes of the proposed software component or service;
wherein Actual comprises non-functional attributes of the available software components or services; and
wherein W comprises a set of weights associated with non-functional attributes.

* * * * *